UNITED STATES PATENT OFFICE.

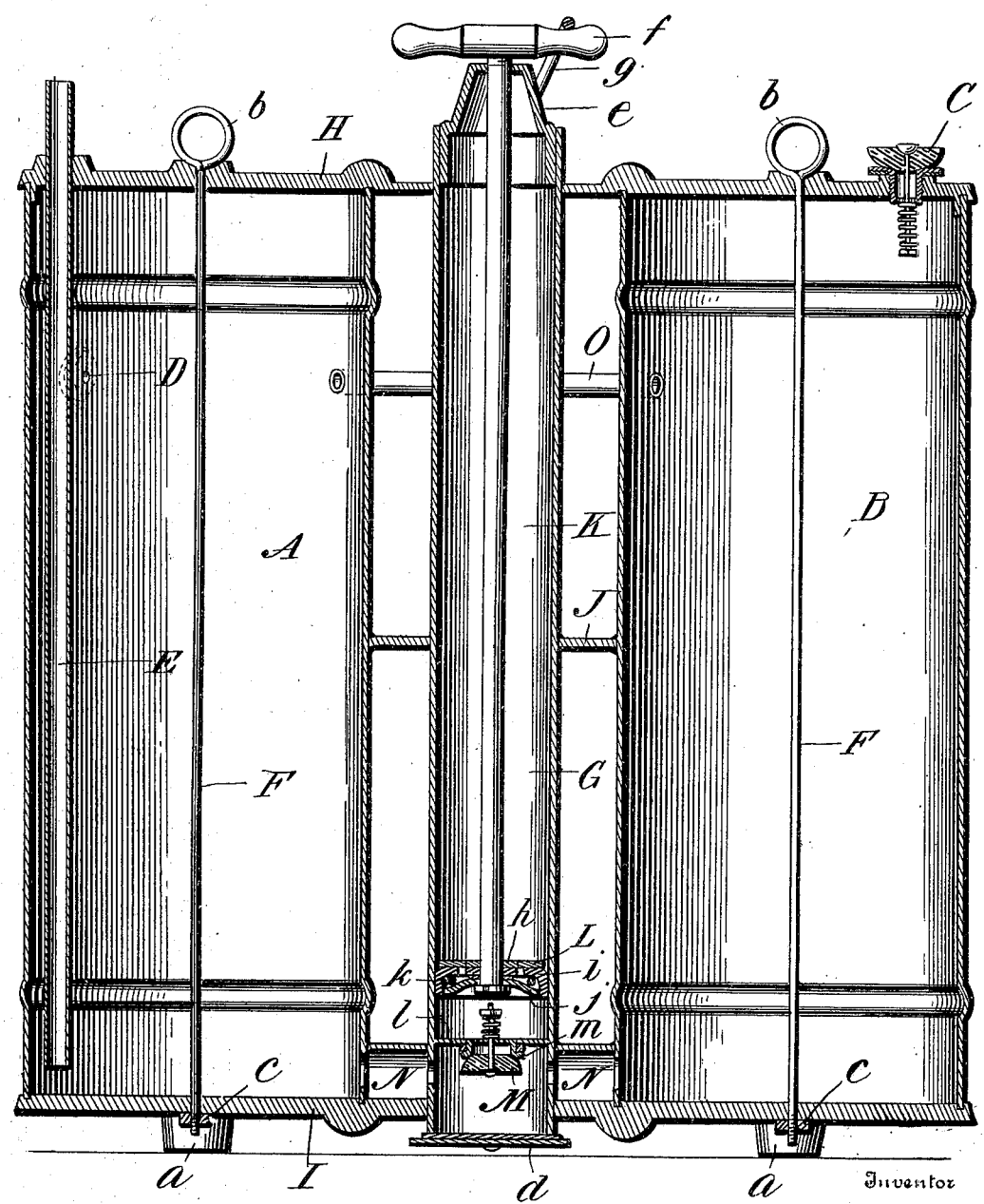

MOTT BILLINGS BROOKS, OF ROCHESTER, NEW YORK.

SPRAYING APPARATUS OR DEVICE.

SPECIFICATION forming part of Letters Patent No. 672,820, dated April 23, 1901.

Application filed January 22, 1901. Serial No. 44,267. (No model.)

*To all whom it may concern:*

Be it known that I, MOTT BILLINGS BROOKS, a citizen of the United States, residing at Rochester, in the county of Monroe and State of New York, have invented certain new and useful Improvements in Spraying Apparatus or Devices; and I do hereby declare that the following is a full, clear, and exact description of the same, reference being had to the annexed drawing, making a part of this specification, and to the letters of reference marked thereon.

The present invention has relation to that class of devices or apparatus especially designed for ejecting fluids or prepared liquids when used as an insecticide upon plants or vegetation or for garden and general household purposes when water is required for irrigation or for washing windows and the like.

It is the object of the invention to provide a device or apparatus which will possess increased strength and durability, and be effective in its operation and general adaptability to the various uses for which it is intended.

The invention consists in a spraying apparatus or device constructed substantially as shown in the drawing and hereinafter described and claimed.

In the accompanying drawing, which represents a sectional elevation of an apparatus or device constructed in accordance with my invention, A B designate two tanks of any suitable form and construction and of any preferred capacity.

In contradistinction to the tanks being used as an air and a liquid reservoir, respectively, each tank is designed to contain the spraying liquid, and the general construction and arrangement of the parts of the apparatus or device with relation to the tanks renders said tanks capable of being both used for the spraying liquid and incapable for use as an air-reservoir and a liquid-reservoir, respectively.

At the top of one of the tanks—preferably the tank B—is a spring-actuated safety-valve C of any suitable form and construction, said valve being detachably connected thereto, so that it may be removed and a suitable funnel inserted when it is desired to fill the tanks.

An air-vent is provided, which is preferably located in the side of the tank A and controlled by a needle or other valve D, any construction of valve that will successfully control the air-vent being used as found best adapted to the purpose, this as well as the safety-valve being left to the manufacturer as to what form of valve would be the most advantageous and successful in its operation.

The tank A is provided with the usual discharge-tube E, which extends up through the top of the tank for connecting therewith the usual rubber hose, the bottom of both tanks having suitable legs or feet $a$ to slightly elevate the tanks when resting on the ground or other support.

The tanks A B are each provided with a central brace-rod F, which extends the entire height of the tank and is provided at its upper end with a ring $b$ or other suitable means for connecting thereto the strap or harness when the apparatus or device is to be suspended from the shoulders. The lower end of the brace-rod F is screw-threaded and extends through the bottom of the tank a sufficient distance to enable a screw-nut to engage the screw-threaded end of the rod to hold the same in place, said nut being shown at $c$.

It will be seen that the central brace-rods materially strengthen the tanks, and when suspended from the shoulders the strain from the weight of the tanks is transferred from the top thereof to the brace-rods, which is considered of material importance in removing any danger of injury to the tanks by their weight when carried by the operator, the rods also acting as stays to strengthen the body of the tanks and rendering them more serviceable.

The tanks A B are located a sufficient distance apart to admit the pump-cylinder G, extending between them, said cylinder at its lower end having a removable cap $d$ of any suitable construction.

In providing the tanks A B with tops and bottoms I prefer to use cast-metal plates H I, said plates having openings therein through which extends the pump-cylinder to form braces therefor and also supports at its top and bottom.

An intermediate brace J surrounds the pump-cylinder G at about its center and has its ends fastened to the tanks over the seams thereof, whereby the tanks at their seams are strengthened.

The piston of the pump-cylinder comprises the piston-rod K and the piston-head L, said piston-rod extending up through a cap e at the upper end of the pump-cylinder and is provided with a suitable handle f for operating it, or any other suitable and well-known means may be provided for operating the piston, the apparatus or device being provided with the usual bail g for carrying it. The piston-head L comprises a plate h, a perforated leather or other suitable flexible packing i, and radial braces j, and the expansion spring-ring k, which is located between the packing and the radial braces, thereby keeping the washer extended, which will always fit the cylinder, and thus prevent lost motion, the spring-ring being held in place by the radial braces or arms. Any suitable means may be provided for holding the expansion spring-ring up against the washer; but I prefer the radial braces or arms, as the same may be used as a wrench in replacing or removing the same, and I do not wish to be understood as confining my invention to any particular form of piston-rod or piston-head, as the same may be changed or modified in form without departing from the principle of my invention.

Near the lower end of the pump-cylinder G is a perforated diaphragm l, with valve-seat m for a suitable spring-actuated valve M, which valve may be of any preferred construction.

A chamber N or other source of communication is formed between the pump-cylinder and the two tanks, thereby enabling the pump to act uniformly and simultaneously with both the tanks containing the spraying fluid or liquid, the air passing from the pump-cylinder into both the tanks.

The tanks A B communicate with each other near the top thereof through the medium of a pipe O, the opening in the pipe being substantially on a line with the vent D. In filling the tanks the vent is opened to allow the air to escape, said vent indicating when there is sufficient fluid in the tanks to allow of space above for the compressed air.

The employment of the two tanks, each of which contains the spraying fluid, providing means by which a communication is formed between the two tanks at or near the top thereof, and a suitable pump communicating with both the tanks and simultaneously acting upon the fluid therein enables a great force of spray with increased power to be obtained.

Any suitable pump or air-forcing device may be substituted for that shown, so long as the same communicates with both the tanks and both tanks communicate with each other, which is deemed necessary for the perfect and successful operation.

Having now fully described my invention, what I claim as new, and desire to secure by Letters Patent, is—

1. A spraying apparatus or device comprising two tanks for containing the spraying fluid or liquid, said tanks communicating with each other at or near the upper end thereof, a discharge-tube extending down through the top of one of the tanks to near the bottom thereof, and a suitable pump communicating with both the tanks at or near the bottom thereof, substantially as and for the purpose set forth.

2. A spraying apparatus or device comprising two tanks for containing the spraying fluid or liquid, said tanks communicating with each other at or near the upper ends, a safety-valve upon one of the tanks, and a suitable pump communicating with both the tanks at or near the bottom thereof, and a discharge-tube extending down through the top thereof to near the bottom thereof, substantially as and for the purpose described.

3. A spraying apparatus or device consisting of two tanks communicating with each other at or near the upper ends thereof, a suitable pump communicating with both the tanks at or near the lower ends thereof, and plates integral with each other to form the tops and the bottoms of the tanks, the ends of the pump-cylinder extending through holes in the plates to form braces therefor, substantially as and for the purpose specified.

4. A spraying apparatus or device, consisting of two tanks for containing the spraying fluid or liquid, said tanks communicating with each other at or near the upper ends thereof, a suitable pump communicating with the tanks at or near the lower ends thereof, and central brace-rods extending through the top and bottom of the tanks and secured thereto, and means upon the upper ends of said rods for connecting a carrying strap or harness, substantially as and for the purpose set forth.

5. A spraying apparatus or device, comprising two tanks, a vent and a safety-valve therefor, said tanks communicating with each other at or near their tops, central brace-rods extending through the tanks and provided at their upper ends with means for attaching the ends of a harness or straps thereto, suitable plates forming the tops and bottoms of the tanks, and a suitable pump or air-forcing device extending through openings in the plates and braced thereby, said pump or device communicating with both the tanks at or near the bottom thereof, substantially as and for the purpose described.

In testimony that I claim the above I have hereunto subscribed my name in the presence of two witnesses.

MOTT BILLINGS BROOKS.

Witnesses:
ALAN PERRY,
WM. C. BROOKS.